United States Patent
Striewe et al.

(10) Patent No.: US 11,907,006 B2
(45) Date of Patent: Feb. 20, 2024

(54) TECHNIQUE FOR CORRECTING A TIME PARAMETER

(71) Applicant: Phoenix Contact GmbH & Co. KG, Blomberg (DE)

(72) Inventors: Martin Striewe, Horn-Bad Meinberg (DE); Vjaceslav Magazinik, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 135 days.

(21) Appl. No.: 17/610,173

(22) PCT Filed: May 13, 2020

(86) PCT No.: PCT/EP2020/063268
§ 371 (c)(1),
(2) Date: Nov. 10, 2021

(87) PCT Pub. No.: WO2022/229509
PCT Pub. Date: Nov. 19, 2020

(65) Prior Publication Data
US 2022/0221894 A1    Jul. 14, 2022

(30) Foreign Application Priority Data
May 15, 2019   (LU) ........................ 101216

(51) Int. Cl.
*G06F 1/08*  (2006.01)
*G06F 1/06*  (2006.01)

(52) U.S. Cl.
CPC . *G06F 1/08* (2013.01); *G06F 1/06* (2013.01)

(58) Field of Classification Search
CPC .................................... G06F 1/06; G06F 1/08
See application file for complete search history.

(56) References Cited

U.S. PATENT DOCUMENTS

| 3,452,330 | A | 6/1969 | Avery | |
|---|---|---|---|---|
| 9,007,989 | B2* | 4/2015 | Xu | H04L 27/2691 |
| | | | | 370/324 |
| 10,277,385 | B1* | 4/2019 | Anandan | H04L 12/40 |
| 10,924,260 | B1* | 2/2021 | Reinhold | H04B 1/7075 |

(Continued)

FOREIGN PATENT DOCUMENTS

| DE | 102004039219 B3 | 2/2006 |
|---|---|---|
| DE | 102007011684 A1 | 9/2008 |

(Continued)

*Primary Examiner* — Phil K Nguyen
(74) *Attorney, Agent, or Firm* — LEYDIG, VOIT & MAYER LTD.

(57) ABSTRACT

A device for correcting a time parameter in a first node in accordance with a second node is provided. The device includes a clock pulse generator unit configured to provide periodic clock pulses in the first node. The device further includes a peripheral unit configured to decode symbols of an asynchronously transmitted telegram from the second node and to measure a number of clock pulses during the transmission of a symbol sequence of consecutive symbols of the telegram. The device also includes a correction unit configured to correct the time parameter as a function of a ratio of the measured number of clock pulses and the number of consecutive symbols in the symbol sequence.

15 Claims, 4 Drawing Sheets

(56) References Cited

U.S. PATENT DOCUMENTS

| | | | |
|---|---|---|---|
| 11,245,547 B2* | 2/2022 | Antonsson | H04L 12/4625 |
| 11,558,136 B2* | 1/2023 | Fredriksson | H04J 3/0614 |
| 2002/0107979 A1* | 8/2002 | Sarnikowski | H04L 12/44 |
| | | | 370/911 |
| 2005/0251701 A1 | 11/2005 | Fredriksson | |
| 2010/0180142 A1 | 7/2010 | Newald | |
| 2011/0113293 A1* | 5/2011 | Ikeda | G06F 11/07 |
| | | | 714/701 |
| 2015/0074306 A1 | 3/2015 | Ayyagari et al. | |
| 2015/0355964 A1* | 12/2015 | Tsern | G06F 3/064 |
| | | | 714/764 |
| 2016/0224443 A1* | 8/2016 | Kuba | G06F 11/2033 |
| 2019/0058895 A1* | 2/2019 | Deshpande | H04N 21/8451 |
| 2020/0073838 A1* | 3/2020 | Knorr | G06F 1/14 |
| 2020/0304224 A1* | 9/2020 | Neugeboren | H04L 43/106 |
| 2021/0337266 A1* | 10/2021 | Van Veldhuisen | |
| | | | H04N 21/234309 |

FOREIGN PATENT DOCUMENTS

| | | |
|---|---|---|
| DE | 102011115965 A1 | 4/2013 |
| WO | 2013144001 A1 | 10/2013 |

\* cited by examiner

TECHNIQUE FOR CORRECTING A TIME PARAMETER

CROSS-REFERENCE TO PRIOR APPLICATIONS

This application is a U.S. National Phase application under 35 U.S.C. § 371 of International Application No. PCT/EP2020/063268, filed on May 13, 2020, and claims benefit to Luxembourg Patent Application No. LU 101216, filed on May 15, 2019. The International Application was published in German on Nov. 19, 2020 as WO 2020/229509 under PCT Article 21(2).

FIELD

The invention relates to the correction of a time parameter in a connected node. In particular, the invention relates to a device and to a method for correcting a time parameter in a first node in accordance with a second node.

BACKGROUND

The number of networked devices increases rapidly in many areas. For example, devices that themselves do not have a user interface are increasingly networked. Networked devices that use the internet protocol (IP) for communication at a higher level are also referred to as the Internet of Things (IoT). Regardless of the application, the presence of a user interface, or the connection to a cloud service, networked devices are referred to herein as nodes.

The physical layer of communication between the nodes may comprise asynchronous data transmission without clock lines, for example for ease of installation or in order to use existing 2-wire lines. Asynchronous data transmission makes a field bus possible. This enables the networking of sensors and actuators in switchgear boxes, production plants, and vehicles. Field buses for this purpose are Interbus and the bus in a so-called controller area network (CAN bus). Application examples are industrial production under the designation "Industry 4.0" or autonomous driving. Asynchronous data transmission also makes field buses possible for networking consumption meters or heating systems in residential buildings for remote reading and home automation. For the last purpose, the metering bus (also: M-Bus) has been established in the EN 13757 series of standards.

The term "asynchronous" refers here to the format of data transmission, for example by means of a start bit. The directly networked nodes must be "synchronous" with each other in the sense of an externally uniform system symbol rate. The latter is referred to herein as synchronization in order to avoid confusion of terms with asynchronous data transmission.

In order to maintain synchronization in asynchronous data transmission proceeding from the start bit at least during the transmission of a character, each node must conventionally have a sufficiently precise and stable clock pulse generator. This is described, for example, in document U.S. Pat. No. 3,452,330 A. Such a clock pulse generator, for example a crystal oscillator, does however increase the production costs and power consumption of each node.

In order to maintain synchronization of the nodes when clocked by means of lower-power resonant circuits, stuffed bits are sent in a CAN bus. However, these stuffed bits reduce protocol efficiency and increase the complexity of signal processing in each node.

SUMMARY

In an embodiment, the present invention provides a device for correcting a time parameter in a first node in accordance with a second node, comprising: a clock pulse generator unit configured to provide periodic clock pulses in the first node; a peripheral unit configured to decode symbols of an asynchronously transmitted telegram from the second node and to measure a number of clock pulses during the transmission of a symbol sequence of consecutive symbols of the telegram; and a correction unit configured to correct the time parameter as a function of a ratio of the measured number of clock pulses and the number of consecutive symbols in the symbol sequence.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
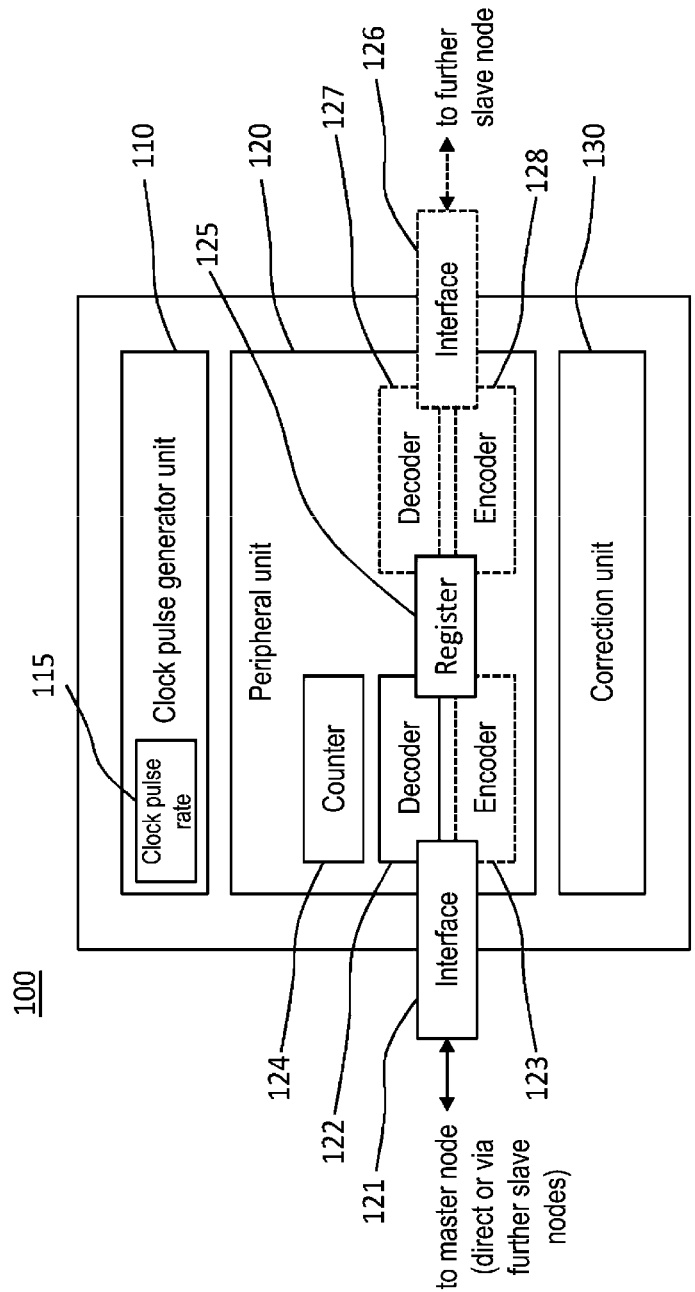
FIG. 1 shows a schematic representation of an exemplary embodiment of a device for correcting a time parameter in a first node in accordance with a second node.

In an embodiment, the present invention provides a more efficient technique for synchronizing nodes that transmit data asynchronously.

According to one aspect of the invention, a device for correcting a time parameter in a first node in accordance with a second node is provided. The device comprises a clock pulse generator unit designed to provide periodic clock pulses in the first node. The device furthermore comprises a peripheral unit which is designed to decode symbols of an asynchronously transmitted telegram from the second node and to measure a number of clock pulses during the transmission of a symbol sequence of consecutive symbols of the telegram. The device furthermore comprises a correction unit designed to correct the time parameter as a function of the ratio of the measured number of clock pulses and the number of consecutive symbols in the symbol sequence.

The time parameter may be a clock-pulse rate of the clock pulse generator unit, a symbol rate of decoding, a control parameter for controlling the clock pulse rate, and/or a control parameter for controlling the symbol rate.

Exemplary embodiments of the device can prevent an error and/or a discontinuance of decoding in the event of a (for example temperature-dependent) drift of the clock pulse of the clock pulse generator unit. For example, a first deviation of the clock pulse rate of the clock pulse generator unit and/or the symbol rate of the decoding, which is not yet preventing the decoding, can be determined by measuring the ratio and can be corrected or compensated by the correction unit as a function of the measured ratio. In particular, correction of the time parameter may directly correct or (for example, completely or at least partially) compensate for the deviation of the clock pulse rate and/or the symbol rate.

The same or further exemplary embodiments of the device can, based on the time parameter corrected in response to the first deviation, enable further decoding and/or further correction according to the invention in the event of a second deviation that is greater than the first deviation. An error or discontinuance of decoding can be prevented. For example, the second deviation can be so great that, without correction of the time parameter in response to the first deviation, decoding following the second deviation would fail, whereas decoding will succeed according to the invention, for example because a deviation interfering with the decoding is limited to the difference between the second deviation and the first deviation.

Acquisition (for example, sampling) of the telegram transmitted from the second node and/or decoding the symbols of the telegram (for example, based on sample values of the sampling) can be clocked by the clock pulse generator unit and/or configured by the time parameter. As soon as the time parameter has been corrected by the correction unit, acquisition and/or decoding can take place according to the corrected time parameter. For example, a first telegram or a first character within the telegram may be the basis for correction of the time parameter by the correction unit. This means that the consecutive symbols in the symbol sequence may be symbols of the first telegram or of the first character. The corrected time parameter can be used when acquiring and/or when decoding a second telegram (which is transmitted from the second node immediately after the first telegram) or a second character of the first telegram.

The same or further exemplary embodiments of the device may implicitly correct the time parameter only based on the asynchronous transmission from the second node to the first node and/or in the absence of a control line between the first node and the second node.

The time parameter can (for example, directly or indirectly) control or influence the decoding. The time parameter may be a temporal parameter of decoding (decoding parameter).

The time parameter may comprise a clock pulse rate of the first node, a symbol rate of the first node, and/or a ratio of clock pulse rate and symbol rate (also: divider) of the first node. The time parameter may comprise a divider (for example, an integer divider). The symbol rate may be determined from the clock pulse rate (i.e., starting from the clock pulse of the clock pulse generator unit) according to the divider. For example, there is only one clock pulse generator unit in the first node both for measuring the number of clock pulses and for decoding. According to the divider, the symbol rate may be an integral fraction of the clock pulse rate. For example, the device may comprise a frequency divider that generates the symbol rate from the clock pulse rate according to the divider.

For example, a signal of the telegram received by the second node may be sampled or undersampled by the first node according to the clock pulse of the clock pulse generator unit. Alternatively or additionally, the received signal can be divided into the symbols of the telegram according to the symbol rate. Alternatively or additionally, sample values of the received signal can be divided according to the divider into the symbols of the telegram.

The symbol sequence may be shorter than one character within the telegram. The conventional use of stuffed bits for maintaining synchronization during the transmission of a character can thus be avoided. In particular, protocol efficiency can be improved since stuffed bits do not correspond to any symbol for the transmission of data (neither control data nor payload data).

Sampling of the telegram transmitted from the second node or decoding the symbols of the telegram is clocked by the clock pulse generator unit and/or controlled by the time parameter.

The first node may be a node (in particular, a slave node) in a communication chain. The first node may be arranged within or at the end of the communication chain. The communication chain may comprise several nodes that are connected in a series for asynchronous data transmission. The communication chain can be a so-called daisy chain. The second node may be a master node and/or a node upstream of the first node in the communication chain. The third node may be a further node (in particular a further slave node) and/or a node downstream of the first node in the communication chain.

The peripheral unit may comprise a first (for example, serial) interface for asynchronous transmission of the telegram from the second node and/or a second (for example, serial) interface for asynchronous transmission of a telegram to a third node. Both the first interface and the second interface may be clocked by the clock pulse generator unit and/or controlled by the corrected time parameter.

The peripheral unit may comprise an encoder and/or a decoder for each interface. The respective encoder and/or decoder may be designed to encode or decode the symbols of a character of a transmitted or received telegram as a function of the time parameter.

The time parameter may comprise a clock pulse rate of the clock pulse generator unit. The correction unit may be designed to correct the clock pulse rate of the clock pulse generator unit as a function of the ratio of the measured number of clock pulses and the number of consecutive symbols in the symbol sequence. With respect to an actual clock pulse rate of the clock pulse generator unit, the corrected clock pulse rate may be corrected by the quotient of a predetermined number of clock pulses per symbol and the measured ratio. The predetermined number of clock pulses per symbol may correspond to the quotient of the corrected clock pulse rate (or the target clock pulse rate) of the clock pulse generator unit and the system symbol rate.

Alternatively or additionally, the time parameter may comprise a symbol rate (also: baud rate) of the peripheral unit. The correction unit can be designed to correct the symbol rate of the peripheral unit as a function of the ratio of the measured number of clock pulses and the number of consecutive symbols in the symbol sequence. The corrected symbol rate may be corrected with respect to a predetermined system symbol rate by the quotient of the measured ratio and a predetermined number of clock pulses per symbol.

The signal of a character of the telegram from the second node can be divided according to the symbol rate into the symbols of the telegram. A small error in the symbol rate, for example a deviation of the symbol rate by less than half a symbol per character, can be corrected on the basis of a start symbol and a stop symbol (or several stop symbols) of the character. For example, the signal of the particular character between the start symbol and the stop symbol may be divided into symbols of equal length.

Alternatively or additionally, the time parameter may comprise a divider for a symbol rate of the peripheral unit relative to a clock pulse rate of the clock pulse generator unit. The correction unit may be designed to correct the divider as a function of the ratio of the measured number of clock pulses and the number of consecutive symbols in the symbol sequence. The corrected divider may be equal to or proportional to the measured ratio.

The symbol sequence of consecutive symbols of the telegram may extend from a first falling (or first rising) edge to a later, first rising (or first falling) edge of the transmission of the telegram.

The device can be implemented by means of a microcontroller. A processor unit, for example of the microcontroller, can implement the correction unit.

The microcontroller may comprise the clock pulse generator unit, the peripheral unit, and/or the correction unit. The microcontroller may furthermore comprise a capture/compare unit (CC unit) to which a received signal of the telegram from the second node is applied. The CC unit can be designed to measure the number of clock pulses during the transmission of the symbol sequence.

For example, the symbol sequence of the telegram may only comprise symbols for the transmission of payload data. The symbol sequence of the telegram on which measurement of the number of clock pulses is based can immediately follow a start bit and only contain symbols for payload data.

The symbol sequence of the telegram may be shorter than a character of the telegram. Alternatively or additionally, the symbol sequence of the telegram may be a part of the first character of the telegram.

The peripheral unit may also be designed to measure a number of clock pulses during the transmission of a predetermined synchronization character of the telegram. The correction unit may also be designed to correct the time parameter as a function of the ratio of the measured number of clock pulses and a predetermined number of symbols in the synchronization character and/or as a function of a quotient of the measured number of clock pulses and a predetermined target value of the number of clock pulses during the transmission of the synchronization character. The synchronization character can be transmitted at the beginning of the telegram.

Correction on the basis of the synchronization character can always be carried out at the beginning of transmission of the telegram and/or if decoding of the symbols in the telegram is not possible due to error in or deviation of the time parameter. For example, at the beginning of transmission of the telegram, the time parameter can be corrected by means of the synchronization character. During the transmission of the telegram, the time parameter can be corrected as a function of the ratio of the measured number of clock pulses and the number of consecutive decoded symbols in the symbol sequence.

According to a further aspect, an arrangement of nodes connected in series (e.g., topologically linearly) for asynchronous data transmission is provided. The arrangement comprises a first node which is connected to a second node for asynchronous data transmission and which comprises an exemplary embodiment of the device for correcting a time parameter in the first node in accordance with the second node according to the device aspect. Optionally, the arrangement comprises the second node as master node of the arrangement. The arrangement furthermore comprises a third node which is connected to the first node for asynchronous data transmission and which comprises a further exemplary embodiment of the device for correcting a time parameter in the third node in accordance with the first node according to the device aspect.

In accordance with yet another aspect of the invention, a method for correcting a time parameter in a first node in accordance with a second node is provided. The method comprises or initiates a step of providing periodic clock pulses (for example, a step in the clocking) in the first node. The method furthermore comprises or initiates a step of decoding symbols of an asynchronously transmitted telegram from the second node and of measuring a number of clock pulses during the transmission of a symbol sequence of consecutive symbols of the telegram. The method furthermore comprises or initiates a step of correcting the time parameter as a function of the ratio of the measured number of clock pulses and the number of consecutive symbols in the symbol sequence.

The method may furthermore comprise any step and any feature disclosed in the context of the device aspect, and vice versa.

FIG. 1 shows a schematic block diagram of an exemplary embodiment of a device, designated overall by reference sign 100, for correcting a time parameter in a first node in accordance with a second node.

The device 100 comprises a clock pulse generator unit 110 which provides periodic clock pulses in the first node. The device 100 furthermore comprises a peripheral unit 120 which decodes symbols of a telegram transmitted asynchronously from the second node and which measures by means of a counter 124 a number of clock pulses during the transmission of a symbol sequence of consecutive symbols of the telegram. The device 100 furthermore comprises a correction unit 130 which corrects the time parameter as a function of the ratio of the measured number of clock pulses and the number of consecutive symbols in the symbol sequence 406.

The time parameter may comprise a clock pulse rate 115 of the provided clock pulses or a control parameter of the clock pulse generator unit for controlling the clock pulse rate. Alternatively or additionally, the time parameter may comprise a symbol rate 125 of the peripheral unit 120 or a control parameter of the peripheral unit for controlling the symbol rate 125. At least the latter example of the time parameter may, as shown schematically in FIG. 1, be written to a register of the peripheral unit 120.

The control parameter for controlling the symbol rate may be a divider of the clock pulse rate. For example, the symbol rate may be the clock pulse rate 115 divided by the divider.

The symbol rate 125 may be a function of the time parameter. For example, the symbol rate may be the quotient of the clock pulse rate 115 and the divider, wherein the clock pulse rate 115 and the divider are in each case examples of the time parameter.

The symbol sequence may be determined by the consecutive symbols. For example, the symbol sequence may extend from a first falling (or rising) edge to a first rising (or falling) edge in a signal of the telegram received by the peripheral unit 120.

The number of clock pulses during the symbol sequence may be written to the counter 124. The counter 124 may, for example, be set to zero at the beginning of the telegram and/or at the beginning of the symbol sequence. With each clock pulse of the clock pulse generator unit 110, the counter 124 can be incremented by one. The correction unit 130 may read out from the counter 124 the measured number of clock pulses at the end of the symbol sequence, for example as denominator of the ratio of the number of clock pulses to the number of symbols in the symbol sequence.

The peripheral unit 120 furthermore comprises a decoder 122 which carries out the decoding of the telegram received from the second node. The decoder 122 may output to the correction unit 130 the number of consecutive symbols belonging to the symbol sequence. Alternatively or additionally, on the basis of the symbols output by the decoder 122, the correction unit can determine a beginning and/or an end of the symbol sequence and/or the number of symbols in the symbol sequence.

Optionally, the device 100 or the first node is designed for bidirectional communication with the second node. For this purpose, the device 100 or the first node may comprise a first interface 121 comprising the decoder 122 and also an encoder 123. The encoder 123 is designed to generate the symbols for a telegram that is sent to the second node via the first interface 121.

Furthermore, the device 100 or the first node may be in asynchronous data exchange with a third node via a second interface 126. For this purpose, the device 100 or the first node can comprise the second interface 126. The second interface 126 can comprise a decoder 127 and an encoder 128 for receiving or sending telegrams from or to the third node.

The second node may be a master node or a slave node (for example, a higher-ranking slave node compared to the first node) which specifies a system symbol rate to the first node solely on the basis of the asynchronous data transmission. The first node may be a slave node in relation to the second node. The third node may be a slave node (for example, a lower-ranking slave node compared to the first node).

The same symbol rate 125 can be applied to both interfaces 121 and 126. For example, the correction unit 130 can correct the time parameter as a function of the ratio measured at the first interface 121. As a result, compliance with the symbol rate 125 can thereby also be achieved at the second interface 126, for example. In particular, the symbol rate (for example, on the output side, i.e., in the course of transmitting an asynchronously transmitted telegram) specified at the first interface (for example, on the input side, i.e., in the course of receiving an asynchronously transmitted telegram) can be passed on at the second interface. The master node can thus specify a uniform system symbol rate via several slave nodes connected in series for asynchronous data transmission.

Each of the two interfaces 121 and 126 of the first node may be a so-called universal asynchronous receiver transmitter (UART) interface.

Figure 2:
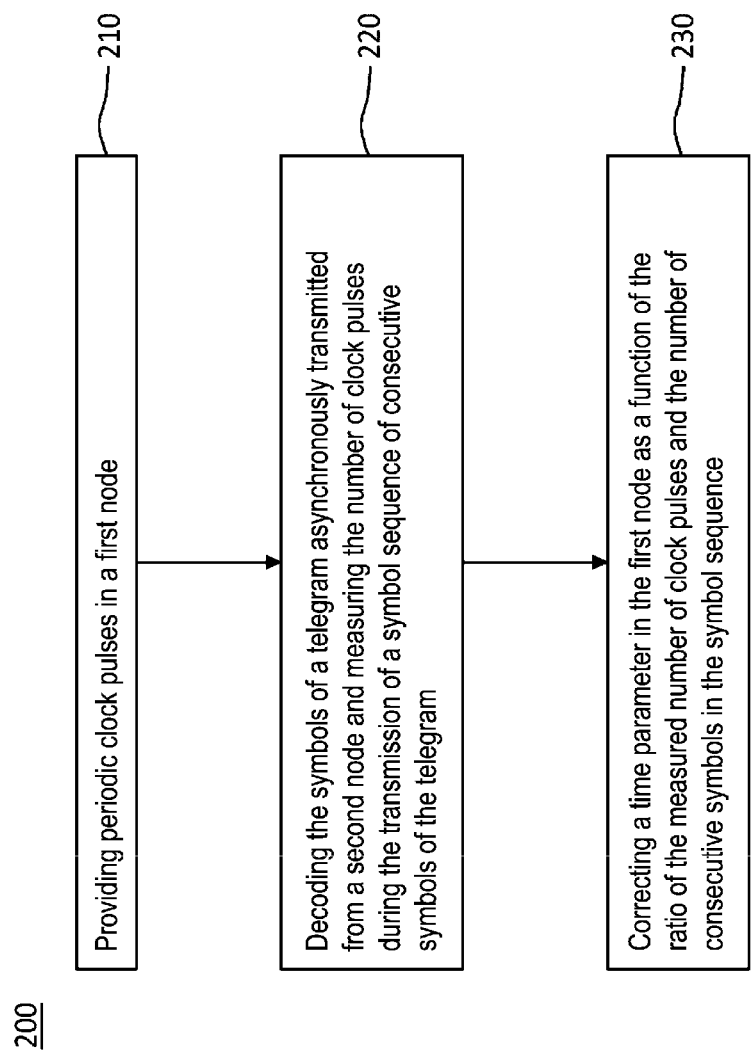
FIG. 2 shows a flow chart of an exemplary embodiment of a method for correcting a time parameter in a first node in accordance with a second node, which can be executed by means of the device in FIG. 1.

FIG. 2 shows a flow chart of an exemplary embodiment of a method, designated overall by reference sign 200, for correcting a time parameter in a first node in accordance with a second node.

In a step 210, periodic clock pulses are provided in the first node. Symbols of an asynchronously transmitted telegram from the second node are decoded in a step 220. Furthermore, in step 220, a number of clock pulses is measured during the transmission of a symbol sequence of consecutive symbols of the telegram. In a step 230, the time parameter is corrected as a function of the ratio of the measured number of clock pulses and the number of consecutive symbols in the symbol sequence (in short: the measured ratio).

In each aspect of the invention, the number of consecutive symbols in the symbol sequence may be determined on the basis of the decoding. For example, the number of consecutive symbols in the symbol sequence may be determined as the number of decoded symbols which can be temporally assigned to the symbol sequence.

The telegram may comprise a plurality of characters. The characters may also be referred to as bytes. The symbol rate may also be referred to as the baud rate. The data to be transmitted may correspond to a character string of consecutive characters. The data to be transmitted may comprise payload data and/or control data. Each character may comprise a certain number of bits, for example 4, 7, 8, 10, or 12 bits. Each character can be encoded according to an encoding method (i.e., output as a transmitted signal on a transmission line) or decoded (i.e., acquired from a received signal on a reception line). Each symbol may correspond to one or more bits, for example depending on the encoding method.

For the sake of simplicity, it is assumed below without restricting generality that each bit corresponds to a symbol.

In conventional asynchronous data transmission, the temperature drift of the clock pulse generator unit 110, i.e., of the clock-pulse-generating components can lead to baud rate errors, which above a certain deviation lead to communication interruptions. In order to prevent this, expensive quartz crystals must conventionally be used for clock pulse generation. Exemplary embodiments of the invention may make it possible to dispense with a quartz crystal in the subordinate nodes (i.e., the slave nodes).

The measurement 220 of the ratio of clock pulses per decoded symbol and/or the correction 230 as a function of the measured ratio can be carried out by the device 100 in the first node (for example, in one of the slave nodes) for all X received telegrams, where X is a predetermined integer.

The correction unit may measure the symbol sequence as part of the first byte of the received telegram. From the number of bits and the measured clock pulses, the measured ratio, i.e., the number of clock pulses per bit (in short: clock pulses/bit) is ascertained. The measured ratio may also be referred to as the actual clock pulses per bit (in short: actual clock pulses/bit).

In one exemplary embodiment, a number of target clock pulses per bit (in short: target clock pulses/bit) is predetermined. The correction unit 130 calculates the difference between the target clock pulses and the actual clock pulses per bit, i.e.

deviation=target clock pulses/bit−actual clock pulses/bit.

This is the deviation in clock pulses per bit.

In order to correct the baud rate 125 in the first node (i.e., in the slave node), the correction unit 130 assumes the previous baud rate. This may numerically correspond to the system baud rate but, due to a deviation in the clock pulse rate 115, may correspondingly deviate from the system baud rate. The value of the system baud rate is thus the numerical value in the "slave baud rate" register before correction. After correction of this register value as an example of the time parameter, the "slave baud rate" register contains the value corrected baud rate=system baud rate[1±correction factor(deviation)]=system baud rate±correction rate(deviation)

The correction factor or the correction rate is a function of the deviation. For example, correction factor(deviation)=deviation/[target clock pulses/bit].

By correcting the baud rates for both interfaces 121 and 126 of the slave node (as an example of the first node), the slave node next in the linear topology (for example, the first node as the next low-level node after the second node) can adapt its baud rate to the baud rate of the previous master or slave node (for example, the second node).

By correcting the baud rate 125 as an example of the time parameter, an internal adaptation is realized, by means of which the baud rate of the respective slave node that can be observed from the outside (for example, at the second interface 126) with an increase in its temperature remains at the defined system baud rate (preferably specified solely by the asynchronous data transmission from the master node).

Figure 3:
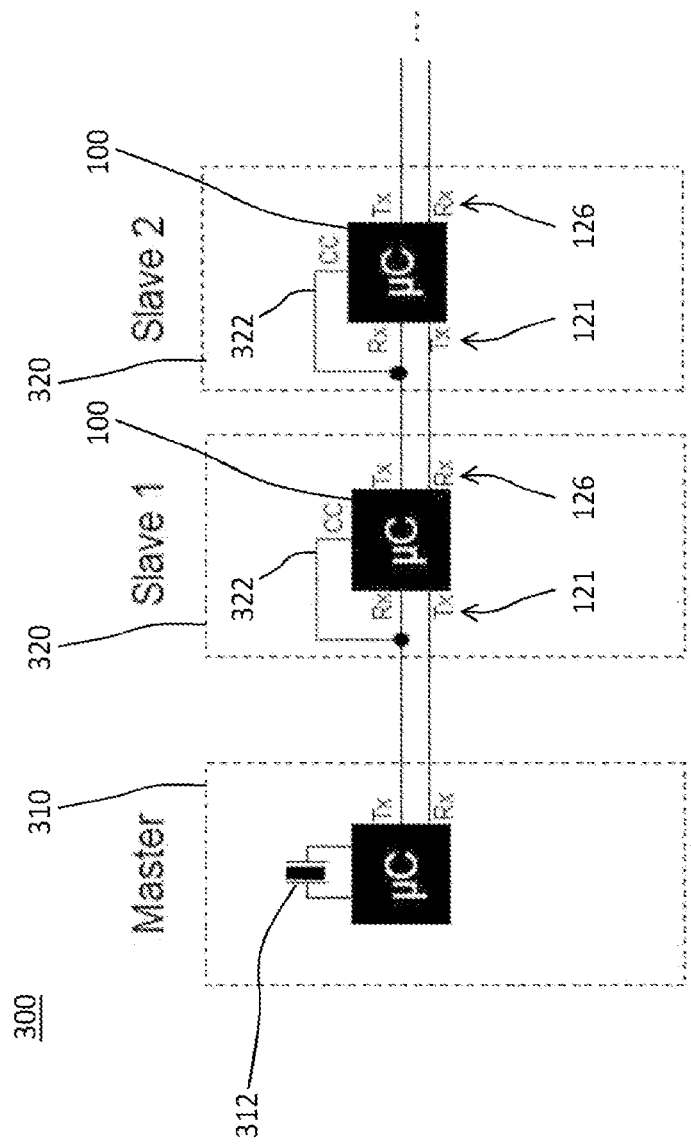
FIG. 3 shows a schematic representation of an exemplary arrangement of several nodes which are connected in series and which can at least partially embody the device in FIG. 1.

FIG. 3 schematically shows an arrangement 300 (also: system) of several nodes connected in series (i.e., topologically linearly) for asynchronous data transmission. A first node of the arrangement may as master node 310 specify the system baud rate for the entire arrangement 300 in that each slave node 320 downstream of the master node 310 comprises an exemplary embodiment of the device 100.

For example, the master node 310 (preferably as the only node in the arrangement 300) comprises an oscillating quartz crystal 312. By means of the oscillating quartz crystal 312, the master node generates a symbol sequence when transmitting the telegram, the symbol rate of which specifies the system symbol rate.

In particular, the first interface 121 is connected in each case to the adjacent node (i.e., the so-called second node), which is topologically closer to the master node 310 than the respective node (i.e., the so-called first node). The second interface 126 is in each case connected to the adjacent node (i.e., the so-called third node), which is topologically further away from the master node 310 than the respective node (i.e., the first node).

Such an arrangement 300 may also be referred to as a daisy chain. A telegram (for example, one starting from the master node 310) that passes through the arrangement 300 from slave node 320 to slave node 320 may also be referred to as a daisy-chain telegram.

While more cost-effective internal oscillators are highly temperature-dependent, exemplary embodiments of the device can prevent a drift of the baud rate in the event of slave nodes 320 heating up and thus save more expensive oscillating quartz crystals in the slave nodes.

A preferred exemplary embodiment implements the device 100 by means of a microcontroller (the one labeled "μC" in short in FIG. 3). A so-called capture/compare unit (CC unit) in the microcontroller can implement the counter 124 in order to measure the clock pulses/bit ratio, to ascertain the target baud rate of the system from the daisy-chain telegram, and thus to compensate for a temperature drift of the internal oscillator. For this purpose, the signal of the telegram from the second node is applied to a signal input 322 of the CC unit, for example by a receiving line (which is labeled "Rx" in FIG. 3) of the first interface 121 being connected to the signal input 322.

Figure 4:
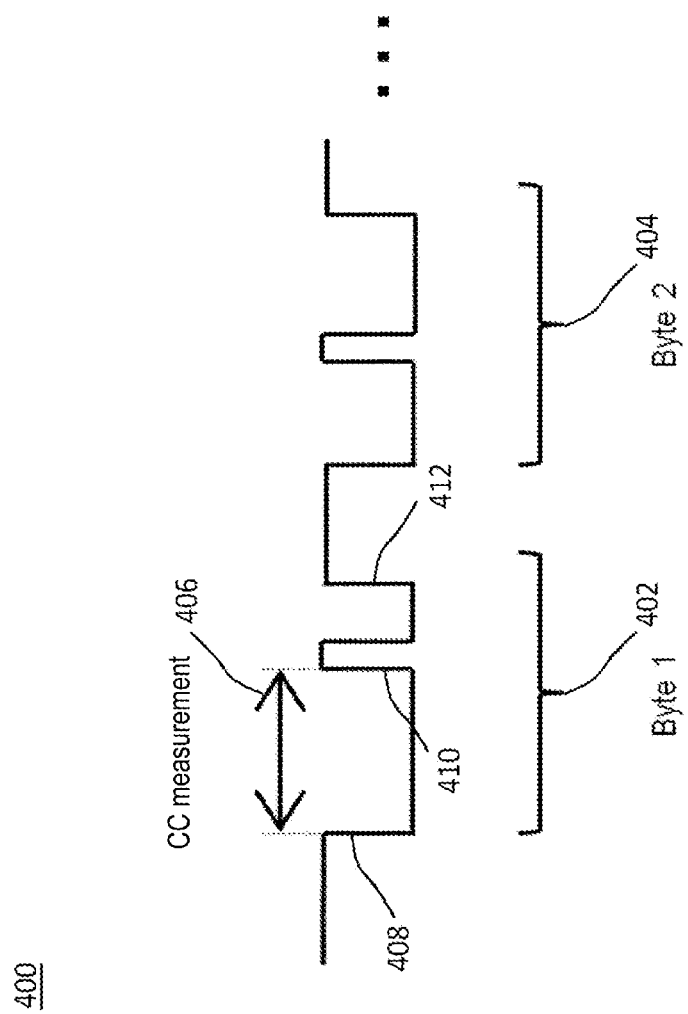
FIG. 4 shows a schematic representation of an exemplary telegram which can be transmitted from or to one of the nodes.

FIG. 4 schematically shows the beginning of a signal of a telegram 400. In the schematic representation of FIG. 4, time increases from left to right. A voltage level of the signal is shown schematically in the vertical direction.

The telegram comprises several characters (i.e., bytes) 402 and 404. The symbol sequence 406 measured by the peripheral unit 120 (for example, the CC unit) is part of the first character 402. In other words, the measured symbol sequence 406 ends with or before the last symbol (preferably the last data symbol) of the first character 402.

For example, the beginning of the measured symbol sequence 406 is defined by the first falling edge 408 in the first character 402 of the telegram 400, and the end of the measured symbol sequence 406 is defined by the first rising edge 410 after the first falling edge 408. The first falling edge 408 may correspond to a start bit. Alternatively or additionally, the first rising edge 410 after the falling edge 408 may be before a stop bit 412 (or before several stop bits) of the first character 412. Each character 402 and 404 can be framed by start and stop bits.

An implementation of the method 200 may measure the number of clock pulses in the symbol sequence 406 according to step 220 every X received telegrams 400 (i.e., after X received telegrams 400 in each case), for example by activating the CC unit in the slave node 320. The CC unit in the slave node 320 measures the clock pulses from falling edge 408 to the rising edge 410 of the first received byte 402.

According to step 220, the peripheral unit 120 of the slave node 320 decodes the symbols (i.e., the bits) of the first byte 402. In other words, the slave node 320 evaluates the first byte 402 to arrive on its receiving line and ascertains how many symbols (i.e., bits) were encompassed by the symbol sequence 406 (i.e., by the CC measurement in step 220). From the number of bits and the measured number of clock pulses (also: CC clock pulses), the ratio of CC clock pulses per bit (also: CC clock pulses/bit) can be calculated. This ratio is the measured ratio or actual ratio (in short: actual clock pulses/bit).

In a first variant of the exemplary embodiment, the symbol rate 125 of the slave node 320 is controlled by the divider with respect to the clock pulse rate 115. The divider is an example of the time parameter. In the first variant, the measured ratio can be set as the corrected divider, for example by writing the measured ratio to the corresponding register for controlling the symbol rate 125.

In a second variant of the exemplary embodiment, in the correction unit 130 of the slave node 320, the number of target clock pulses per bit (in short: target clock pulses/bit), i.e., the target value of the ratio, is predetermined as a constant. The target value of the ratio can be calculated from the quotient of a target clock pulse rate (for example CC_Clock) and the system baud rate. A numerical example of this is:

$$CC\_clock/baud\ rate = 48{,}000{,}000\ clock\ pulses/312.5\ kBd = 153.6\ clock\ pulses/bit.$$

The deviation of the ratio measured in step 220 from the predetermined target value of the ratio is calculated as clock_pulse_per_bit_difference:

$$clock\_pulse\_per\_bit\_difference = target\ clock\ pulses/bit - actual\ clock\ pulses/bit,\ that\ is,\ the\ deviation\ in\ clock\ pulses\ per\ bit.$$

In step 230, the correction unit 130 corrects the numerical baud rate 125 in the slave node 320 as an example of the time parameter. Prior to the correction, the numerical baud rate 125, for example the value "slave_baud" in the corresponding register of the interfaces 121 and 126, is equal to the system baud rate. The corrected numerical baud rate is $$slave\_baud = system\ baud\ rate \pm correction\ factor\ (clock\_pulse\_per\_bit\_difference)$$

By correcting the baud rates, for both slave UARTs 121 and 126, the next slave node (i.e., the third node) can adapt its baud rate to the baud rate of the previous slave node (i.e., the first node).

As a result of the internal adaptation, as the temperature increases, the baud rate of the slave node remains at the defined system baud rate, which can be observed from the outside.

As shown on the basis of the above exemplary embodiments and their variants, the device 100 can be implemented in any system (in particular in any arrangement 300) which has a defined system symbol rate (i.e., a target baud rate). A numerical example of the system symbol rate is 312.5 kBd=312,500 Bd, where Bd stands for the unit baud, i.e., symbols per second (for example, bits per second).

In step 220, measurement of the number of clock pulses within the symbol sequence 406 in each slave node can preferably be carried out by means of a capture/compare unit which, for example, measures the number of clock pulses between edge changes in the signal of the received telegram.

As an alternative or in addition to each exemplary embodiment and each variant, at least one of the following options can be implemented. A first implementation option dispenses with the oscillating quartz crystal 312 in the master node 310. For example, the technique can be implemented with a master node, which in turn can be integrated as a slave into a higher-level system. For this purpose, the master node 310 is optionally equipped with an exemplary embodiment of the device 100 that adapts the symbol rate of the master node to the higher-level system, for example without the higher-level system supporting a master/slave mechanism.

The described implementation of the method 200 evaluates the content of the received byte 402 (i.e., the byte 402 is decoded) for measuring the number of clock pulses in the symbol sequence 406 by means of the counter 124 (for example, by means of the capture/compare unit). This assumes that this byte 402 can still be decoded (i.e., received), i.e., the deviation (or the existing error) of the symbol rate that has arisen up to that point is still below a threshold of a decoding error (i.e., a threshold of non-receivability). Alternatively or additionally, a second implementation option avoids this limitation (for example, a limitation on the volatility of the clock pulse rate 115) by transmitting a synchronization character 402 (for example, a synchronization byte prescribed in the communication protocol) at the beginning of the telegram 400 so that the measured ratio does not have to be ascertained from the decoded symbols of the received payload data, and is thus independent of the successful reception (i.e., successful decoding) of a symbol sequence 406. A volatility of the clock pulse rate 115 (for example, an abrupt deviation of the clock pulse rate 115) or a drift range of the clock pulse rate 115, which permits or which continues to permit maintenance of the synchronization for asynchronous data transmission, can thus be further increased. An increase in the telegram length by the synchronization character can be accepted for this.

The number of clock pulses during the transmission of the predetermined synchronization character of the telegram 400 can be measured by means of the CC unit 124. The ratio of the measured number 124 of clock pulses and a predetermined number of symbols in the synchronization character results in the measured ratio, which is the basis for correcting the time parameter, for example without symbols of the synchronization character being decoded or decodable. In one variant of the second implementation option, a quotient of the measured number 124 of clock pulses and a predetermined target value of the number of clock pulses during the transmission of the synchronization character is determined. The numerical symbol rate 125 or the corresponding divider can be corrected by this quotient. Alternatively, the clock pulse rate 115 may be corrected by the reciprocal of this quotient.

As an alternative or in addition to correcting the numerical baud rate 125 or the corresponding divider (as examples of the time parameter), a third implementation option can correct (i.e., calibrate) internal clock pulse generation by means of the clock pulse generator unit 110. In other words, the clock pulse rate 115 (as another example of the time parameter) can be corrected.

The measurement 220 of the number of clock pulses in the symbol sequence 406 can be triggered and ended by the falling and rising edges. For example, the edge change can trigger a hardware interrupt which starts or ends a corresponding measurement routine. For example, a clock (for example, a CC timer) of the peripheral unit 120 (for example, the CC unit) is started or stopped by application of the signal 322, wherein the clock is a counter 124 which is incremented with each clock pulse of the clock pulse generator unit 110. A fourth implementation option implements the measurement 220 of the number of clock pulses in the symbol sequence 406 by interrogating or sampling the received signal at the first interface 121, e.g., by a cyclic interrogation, i.e., by so-called polling. Upon detection of a corresponding edge change in the cyclic interrogation, the counter 124 can be started or stopped.

Although the invention has been described with reference to exemplary embodiments, it will be apparent to a person skilled in the art that various changes can be made and equivalents can be used as substitutes. Furthermore, many modifications can be made in order to adapt a specific situation, a specific topology of asynchronous data transmission, and/or a specific communication protocol to the teaching of the invention. Consequently, the invention is not limited to the disclosed exemplary embodiments but rather encompasses all exemplary embodiments that fall within the scope of the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Device for correcting a time parameter
110 Clock pulse generator unit
115 Time parameter of the clock pulse generator unit, in particular, clock pulse rate or control parameter of the clock pulse rate
120 Peripheral unit
121 First serial interface
122 Decoder of the first interface
123 Encoder of the first interface
124 Counter, in particular capture/compare unit
125 Time parameter of the peripheral unit, in particular, register for symbol rate or control parameter of the symbol rate
126 Second serial interface
127 Decoder of the second interface
128 Encoder of the second interface
130 Correction unit
200 Method for correcting a time parameter
210 Step of clocking
220 Step of decoding and measuring
230 Step of correcting
300 Arrangement in series of connected nodes
310 Master node
312 Oscillator, in particular quartz oscillator, with an oscillating quartz crystal
320 Slave node
322 Signal application to a capture/compare unit
400 Telegram
402 First character of the telegram
404 Second character of the telegram
406 Symbol sequence
408 First falling edge of the telegram, for example, start bit of the first character of the telegram
410 First rising edge of the telegram
412 Stop bit of the first character of the telegram

The invention claimed is:

1. A device for correcting a time parameter in a first node in accordance with a second node, comprising:
   a clock pulse generator unit configured to provide periodic clock pulses in the first node;
   a peripheral unit configured to decode symbols of an asynchronously transmitted telegram from the second node and to measure a number of clock pulses during transmission of a symbol sequence of consecutive symbols of the telegram; and
   a correction unit configured to correct the time parameter as a function of a ratio of the measured number of clock pulses and the number of consecutive symbols in the symbol sequence,
   wherein the symbol sequence of the telegram exclusively comprises symbols for transmission of payload data.

2. The device according to claim 1, wherein the time parameter comprises a clock pulse rate of the clock pulse generator unit, a symbol rate of decoding, a parameter for controlling the clock pulse rate, or a parameter for controlling the symbol rate.

3. The device according to claim 1, wherein a sampling of the telegram transmitted from the second node or the decoding of the symbols of the telegram is clocked by the clock pulse generator unit and/or controlled by the time parameter.

4. The device according to claim 1, wherein the peripheral unit comprises a first serial interface for the asynchronous transmission of the telegram from the second node and a second serial interface for the asynchronous transmission of a telegram to a third node, and wherein both the first interface and the second interface are clocked by the clock pulse generator unit and/or controlled by the corrected time parameter.

5. The device according to claim 1, wherein the time parameter comprises a clock pulse rate of the clock pulse generator unit, and the correction unit is configured to correct the clock pulse rate of the clock pulse generator unit as a function of the ratio of the measured number of clock pulses and the number of consecutive symbols in the symbol sequence.

6. The device according to claim 5, wherein the corrected clock pulse rate is corrected with respect to an actual clock pulse rate of the clock pulse generator unit by a quotient of a predetermined number of clock pulses per symbol and the measured ratio.

7. The device according to claim 1, wherein the time parameter comprises a symbol rate of the peripheral unit, and the correction unit is configured to correct the symbol rate of the peripheral unit as a function of the ratio of the measured number of clock pulses and the number of consecutive symbols in the symbol sequence.

8. The device according to claim 7, wherein the corrected symbol rate is corrected with respect to a predetermined system symbol rate by a quotient of the measured ratio and a predetermined number of clock pulses per symbol.

9. The device according to claim 1, wherein the time parameter comprises a divider for a symbol rate of the peripheral unit relative to a clock pulse rate of the clock pulse generator unit, and the correction unit is configured to correct the divider as a function of the ratio of the measured number of clock pulses and the number of consecutive symbols in the symbol sequence.

10. The device according to claim 9, wherein the corrected divider is equal to or proportional to the measured ratio.

11. The device according to claim 1, wherein the symbol sequence of consecutive symbols in the telegram extends from a first falling edge to a first rising edge of the transmission of the telegram.

12. The device according to claim 1, wherein a microcontroller comprises the clock pulse generator unit, the peripheral unit, and the correction unit, and wherein the microcontroller furthermore comprises a capture/compare unit, to which is applied a received signal of the telegram from the second node and which is configured to measure the number of clock pulses during the transmission of the symbol sequence.

13. The device according to claim 1, wherein the symbol sequence of the telegram is shorter than a character of the telegram and/or is part of the first character of the telegram.

14. The device according to claim 1, wherein the peripheral unit is furthermore configured to measure a number of clock pulses during the transmission of a predetermined synchronization character of the telegram, and wherein the correction unit is furthermore configured to correct the time parameter as a function of the ratio of the measured number of clock pulses and a predetermined number of symbols in the synchronization character and/or as a function of a quotient of the measured number of clock pulses and a predetermined target value of the number of clock pulses during the transmission of the synchronization character.

15. A method for correcting a time parameter in a first node in accordance with a second node, the method comprising:
   providing periodic clock pulses in the first node;

decoding symbols in an asynchronously transmitted telegram from the second node, and measuring a number of clock pulses during transmission of a symbol sequence of consecutive symbols of the telegram; and correcting the time parameter as a function of a ratio of the measured number of clock pulses and the number of consecutive symbols in the symbol sequence, wherein the symbol sequence of the telegram exclusively comprises symbols for transmission of payload data.

* * * * *